US011481398B1

(12) United States Patent
Behm et al.

(10) Patent No.: US 11,481,398 B1
(45) Date of Patent: Oct. 25, 2022

(54) LIFO BASED SPILLING FOR GROUPING AGGREGATION

(71) Applicant: Databricks Inc., San Francisco, CA (US)

(72) Inventors: Alexander Behm, Lafayette, CA (US); Ankur Dave, Berkeley, CA (US); Ryan Deng, Berkeley, CA (US); Shoumik Palkar, Sunnyvale, CA (US)

(73) Assignee: Databricks Inc., San Francisco, CA (US)

( * ) Notice: Subject to any disclaimer, the term of this patent is extended or adjusted under 35 U.S.C. 154(b) by 0 days.

(21) Appl. No.: 17/116,230

(22) Filed: Dec. 9, 2020

(51) Int. Cl.
*G06F 16/2455* (2019.01)
*G06F 16/22* (2019.01)

(52) U.S. Cl.
CPC ...... *G06F 16/24556* (2019.01); *G06F 16/221* (2019.01); *G06F 16/2255* (2019.01); *G06F 16/2282* (2019.01)

(58) Field of Classification Search
CPC ............. G06F 16/24556; G06F 16/221; G06F 16/2255; G06F 16/2282
See application file for complete search history.

(56) References Cited

U.S. PATENT DOCUMENTS

| 10,055,480 B2* | 8/2018 | Gaumnitz | G06F 16/278 |
| 2006/0116989 A1* | 6/2006 | Bellamkonda | G06F 16/24556 |
| 2014/0351239 A1* | 11/2014 | Davis | G06F 16/24553 |
| | | | 707/718 |
| 2017/0024435 A1* | 1/2017 | Kociubes | G06F 16/2453 |
| 2017/0091271 A1* | 3/2017 | Attaluri | G06F 16/2255 |
| 2021/0073233 A1* | 3/2021 | Chavan | G06F 16/2246 |
| 2021/0224257 A1* | 7/2021 | Fender | G06F 16/24534 |
| 2021/0263930 A1* | 8/2021 | Fender | G06F 16/24542 |

* cited by examiner

*Primary Examiner* — Dangelino N Gortayo
(74) *Attorney, Agent, or Firm* — Van Pelt, Yi & James LLP

(57) ABSTRACT

A system for spilling comprises an interface and a processor. The interface is configured to receive an indication to perform a GROUP BY operation, wherein the indication comprises an input table and a grouping column. The processor is configured to: for each input table entry of the input table, determine a key, wherein the key is based at least in part on the input table entry and the grouping column; add the key to a grouping hash table, wherein adding the key to the grouping hash table comprises last-in, first-out (LIFO) spilling when necessary; create an output table based at least in part on the grouping hash table; and provide the output table.

23 Claims, 15 Drawing Sheets

| Country | State/Province | City | Color |
|---|---|---|---|
| USA | NY | NY | Blue |
| USA | NY | NY | Green |
| USA | NY | Rochester | Violet |
| USA | CA | SF | Red |
| USA | CA | LA | Lime |
| USA | CA | LA | Aqua |
| USA | CA | LA | Orange |
| USA | CA | Sacramento | Tan |
| Canada | BC | Vancouver | Ocher |
| Canada | Ontario | Toronto | Yellow |
| Canada | Ontario | Toronto | Black |
| Canada | Ontario | Ottawa | Purple |

⌐ 300

GROUP BY (State/Province)

| State/Province | Count |
|---|---|
| NY | 3 |
| CA | 5 |
| BC | 1 |
| Ontario | 3 |

LIFO BASED SPILLING FOR GROUPING AGGREGATION

BACKGROUND OF THE INVENTION

A database system executes database commands on stored database data. For example, a database system executes structured query language (SQL) commands on database data stored in a table (e.g., organized as a set of rows and columns). A common database command expected by database users to be implemented by a database system is GROUP BY. The GROUP BY command is executed with an input data table and one or more columns of the input table. Note that in some cases the input table is the result of a transformation/projection. The GROUP BY command outputs a table grouped according to the values of the indicated column. For example, all rows with matching values for the column are grouped into a single row. The output optionally includes one or several aggregation columns comprising an aggregation of a column in the input table grouped according to the GROUP BY column values—for example, a count, a sum, a min, a max, an average, etc. The GROUP BY command is typically implemented using an aggregation table, wherein each row is added to the aggregation table using a hash of its value in the column of interest, aggregating rows with the same grouping-column values. For large input data tables, the aggregation table can exceed the available memory of the computing device. Once the available memory is full, data must be transferred to a different storage device (e.g., a large capacity storage, a hard disk, etc.). Transferring only a portion of the aggregation table is challenging—in some cases GROUP BY algorithms transfer the entire aggregation table to storage. This creates a problem where the algorithm's ultimate speed can vary considerably for data sets of slightly different sizes or compositions—one requiring an aggregation table just less than the available memory and one requiring an aggregation table just greater than the available memory.

BRIEF DESCRIPTION OF THE DRAWINGS

Various embodiments of the invention are disclosed in the following detailed description and the accompanying drawings.

FIG. 3 is a diagram illustrating an embodiment of a GROUP BY query.

DETAILED DESCRIPTION

Figure 1:
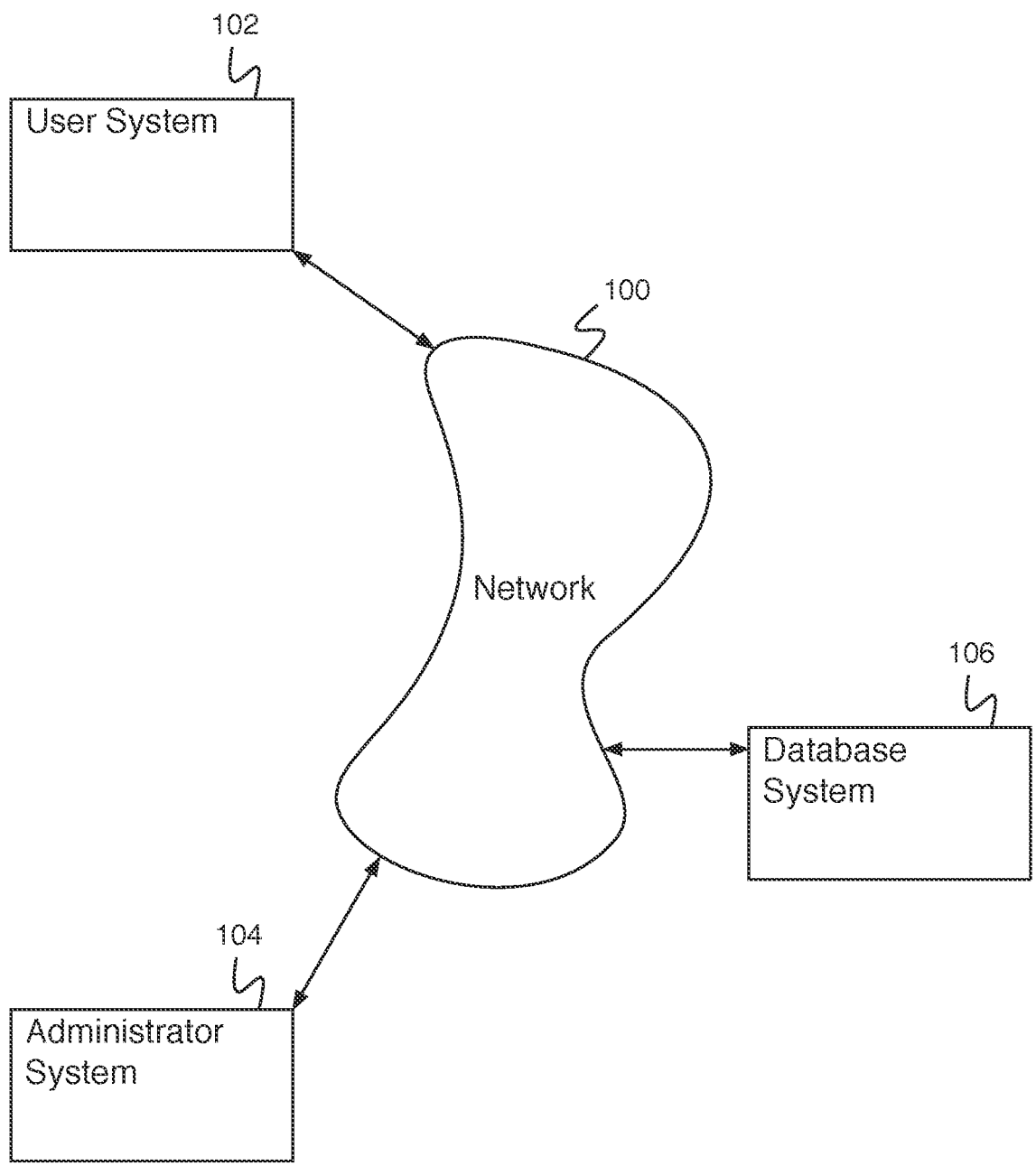
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for spilling is disclosed. The system comprises an interface and a processor. The interface is configured to receive an indication to perform a GROUP BY operation, wherein the indication comprises an input table and a grouping column. The processor is configured to, for each input table entry of the input table, determine a key, wherein the key is based at least in part on the input table entry and the grouping column, add the key to a grouping hash table, wherein adding the key to the grouping hash table comprises last-in, first-out (LIFO) spilling when necessary, create an output table based at least in part on the grouping hash table, and provide the output table.

Existing approaches typically make deliberate tradeoffs between in-memory processing speed and how graceful the performance degrades when data must be spilled. For example, one common approach is to always spill the entire hash table. This means the in-memory processing path is unaffected, but spilling could introduce a performance cliff. Another common approach is to pre-partition the in-memory hash table into several smaller hash tables. The advantage is that spilling can select a subset of partitions to spill, instead of the entire hash table. However, the extra indirection introduced by partitioning penalizes the in-memory path significantly.

The LIFO spilling process allows spilling an arbitrary number of records at a time, while incurring no penalty to the in-memory processing path. The algorithm is designed such that the work performed by LIFO spilling is proportional to the amount of data chosen to be spilled. Further, the asymptotic worst-case performance when spilling a lot of data can match other common approaches.

Any solution to the "spilling" problem of using external storage as a temporary working space for completing GROUP BY aggregations larger than available memory has at least following desired properties.

Fast in-memory path: the spilling mechanism should add minimal overhead to the purely in-memory processing path.

Graceful: When spilling, as little data as possible should be transferred to external storage to avoid performance cliffs. The processing and transfer cost of spilling should be proportional to the amount of data spilled.

Good asymptotic performance: For very large inputs that require most data to be spilled once or even several times, the asymptotic worst-case performance should be reasonable.

Existing approaches typically satisfy (3), but typically do not satisfy either (1) or (3) or choose some tradeoff between them.

A new LIFO-spilling algorithm is disclosed that satisfies all of the requirements above. The main idea is to maintain a single hash table and spill payloads in LIFO order to free a given amount of memory. This trivially satisfies (1) since no extra work is performed when not spilling. Further, an arbitrary number of payloads is chosen that satisfy the request to free memory. Removing entries from the hash table typically poses a problem of maintaining chains of entries due to collisions, but since entries are removed in LIFO order the corresponding entries can simply be cleared in the hash-table bucket structure. Hence, the cost of spilling is proportional to the amount of data transferred, satisfying (2). For satisfying (3), existing approaches can be followed like sorting or partitioning payloads when spilling them to disk to achieve good asymptotic performance.

For ease of exposition, the LIFO spilling algorithm is first described using a simple row-by-row implementation. It is later shown how the basic solution can be adjusted to batched operation for enhanced efficiency. The main challenge in batched operation is to maintain the LIFO guarantee during hash-table resizes and LIFO spilling since batched operation can alter the logical order of entries during re-insertion. A naive solution is to revert to a row-by-row processing model for resizes and LIFO spilling, and otherwise allow batched operation. It is shown herein how a careful coordination of the resizing and LIFO spilling procedures correctly permits the more efficient batched processing in all steps of the GROUP BY aggregation. Intuitively, the strict LIFO order of single payloads is relaxed to a coarser-grained LIFO ordering of partitions of the data. Resizing and LIFO spilling must then operate at the granularity of these partitions.

In the description below and associated figures, aggregation is described in the flow diagram of FIG. 5. Row-by-row aggregation with LIFO spilling is described in three figures: a) FIG. 6, which provides an overview of aggregation; b) FIG. 7, which describes a resizing procedure; and c) FIG. 8, which describes a LIFO spilling procedure. Batched aggregation with LIFO spilling is described in: a) the paragraph following the description of FIG. 9A, which introduces the concept of partially ordered partitions; b) FIG. 9A, which provides an overview of batched aggregation; c) FIG. 9B, which describes a batched resizing procedure; and d) FIG. 11B, which describes a batched LIFO spilling procedure.

A system for data processing comprises a system for executing data processing commands—for example, a GROUP BY command. The system stores data—for example, stored in a data table comprising rows and columns of data. In response to the GROUP BY command, the system aggregates data in the table by values in a column specified along with the GROUP BY command. In order to aggregate the data in the table, each row is added to an aggregation hash table. The hash table is initially created with a predetermined number of buckets (e.g., 1024 buckets, 4096 buckets, etc.), wherein a bucket comprises a memory location. For each row, a hash function is computed for the value associated with the specified column of the row (e.g., the key). A bucket in the hash table for the row is determined by computing the value of the hash function modulo the number of buckets in the hash table. Payload data for the row is created comprising the key and one or more aggregation values that is initialized to 1 or 0 or any other appropriate value. In some embodiments, the key is used uniquely identify, store, and retrieve a record in a database. The payload data is added to a payload data structure—for example, a sequential list of payloads. A pointer to the payload data is added to the determined bucket of the hash table. In the event that the identified bucket in the hash table is occupied (e.g., by a pointer to a payload previously inserted), the key associated with the bucket is determined (e.g., by following the pointer stored in the bucket to a payload data and extracting the key associated with the payload data). In the event the key associated with the bucket matches the key for the row currently being added, the aggregation value associated with the bucket is updated (e.g., the key for the previously entered row and the key for the row being entered match). In the event the key associated with the bucket does not match the key for the row currently being added, a probe process is used to identify a bucket to add the row to. The next bucket in the hash table is checked in the same way the initial bucket was checked. For example, in the event the bucket is empty, a pointer is added to the bucket pointing to the payload data for the row. In the event the bucket is not empty, it is determined whether the key associated with the bucket matches the key for the row being added. In the event the key matches, the aggregation value is updated, and in the event the key does not match, the probe process continues to the next bucket. When all rows have been added to the hash table in this way, either filling an empty bucket of the hash table or incrementing an aggregation value of a previously added payload, the aggregation process is complete. An output table is created based at least in part on the hash table—for example, by building an output table comprising a row for each payload, wherein the row comprises the key and the aggregation value from the payload. The output table is then provided to the requesting user. In some embodiments, updating for aggregation can have any number of grouping keys and any number of functions. Depending on the function, the initialization and updating are different. For example, for the function count the initialization is to a value of 0 and the updating is an increment of 1 for each aggregation. As another example, for the function sum, the initialization is to a value of NULL and the updating is aggregating the values and summing.

The process for adding a row to the hash table additionally checks the hash table to ensure that at least a fraction of buckets are open for adding rows. A typical target fraction is for open buckets is 30-50%. In the event it is determined that all buckets of the hash table are full (e.g., there are no available locations in the hash table to add the row), a process for increasing the bucket table size is executed. The system requests a new chunk of memory from a memory manager, the old bucket table is deleted and a new larger bucket table is created (e.g., utilizing the memory from the old bucket table and the requested memory). For example, the new bucket table is twice the size of the previous bucket table. The system then accesses each payload data in the payload data structure and adds the payload data to the new bucket table using the same process that was initially used. When the system requests the new chunk of memory from the memory manager, it is possible that the memory manager will report that the additional chunk of memory is not available, and request that the GROUP BY process relinquish a certain amount of memory before the additional chunk of memory is granted.

In response to a request from the memory manager to relinquish memory, a spill process is executed. In some embodiments, the request to relinquish memory may or may not be triggered by the GROUP BY itself. For example, it could also be triggered by a different operator in the system, and the GROUP BY was determined as the "victim" that must release memory even if the GROUP BY itself is not requesting more memory. The spill process removes payloads from the payload data structure and corresponding entries from the bucket table in order to free memory. The removed payloads are stored in another storage (e.g., a hard disk, another system, etc.). The spill process determines a payload that can be removed without breaking the bucket table. For instance, the probe process for adding a row to the bucket table requires that entries that were present when a row was added stay in the bucket table from then on, in order for the row to be found again. For example, in the event that the modulo of the hash of a key indicates that a row be added to bucket number 10, but bucket number 10 is full, as well as bucket number 11, 12, and 13. The row can be added to bucket number 14. In the event that a second row with the same key is added, the process is repeated, where bucket number 10 is checked, then 11, 12, 13, and finally 14. The aggregation value associated with the payload linked from bucket 14 is updated because the key matches. In the event that bucket 11 is cleared, when the row is added the second time, bucket 10 will be identified as full, then the empty bucket 11 will be identified and a pointer to the payload will be added to bucket 11. This is incorrect behavior. The only bucket that can be cleared with a guarantee of safety is the bucket associated with the most recently added payload. Since the request to relinquish memory only specifies an amount of memory to relinquish, and not specific entries to remove, the request can be satisfied by removing entries in LIFO order. The LIFO spilling process repeatedly removes the most recently added payload, stores it in another storage location, and clears the associated bucket, until the desired amount of memory has been cleared. In some embodiments, the LIFO spilling process is only used prior to discarding the bucket table (e.g., when increasing the bucket table size) and the associated bucket does not need to be cleared each time a payload is removed. When the requested amount of memory has been cleared, the process for increasing the table size and adding the data entry can continue. After all input data has been consumed there may be several partially aggregated records in external storage (generated by spill events) as well as the remaining contents of the in-memory hash table. In some embodiments, in an intermediate stage of a multi-level aggregation across different threads/processes/machines/etc., it is acceptable to emit partially aggregated records, so the process of emitting results can include simply emitting the in-memory data and the spilled data without further processing. If fully aggregated results must be produced, then the partially aggregated results need to be re-aggregated. In some embodiments, the re-aggregation process starts by first emitting all records from the in-memory hash table that are guaranteed to be final. The finality of records in the hash table can be determined by recording the last element in LIFO order that did not need to be spilled. All records before and including are guaranteed to be complete and can safely be emitted. The remaining records from the hash table are spilled, and then the hash table is cleared to free up memory. To produce the remaining final aggregated data from spilled data, the entire LIFO aggregation process is repeated, treating the spilled data as the new input data. This process may again trigger hash table resizes, spilling, etc. The same steps repeat recursively until all final results have been emitted. In some embodiments this re-aggregation process can be facilitated by partitioning spilled data by a hash function (either immediately during a spill event or at a later time), such that spilled data partition-by-partition can be re-processed. This partitioning guarantees the re-aggregation process can terminate in a logarithmic number of passes over the data.

In various embodiments, several hashing and collision resolution strategies are applicable. For example, open addressing with linear or quadratic probing might be a good choice in some situations, or closed addressing with a linked-list. The LIFO spilling algorithm is adaptable to any of these collision resolution strategies.

In some embodiments, data from the table is processed in batched mode in order to increase efficiency. Processing data in batched mode comprises selecting a batch of rows from the data table in a single operation and adding them to the hash table, minimizing table accesses. When the set of rows from the data table are added to the hash table, an order for them to be added is determined. Rows that can be added to the hash table with 0 probe steps in the bucket table are first added, followed by rows that can be added to the hash table with 1 probe step, followed by rows that can be added to the hash table with 2 probe steps, and so on. This process is similarly used for adding data to a new bucket table when increasing the bucket table size.

The LIFO spilling process improves the computer by allowing a portion of the data stored in an aggregation hash table during a GROUP BY query execution to be moved to an auxiliary storage (e.g., moved from random-access memory to a hard disk) in response to a request from a memory manager to relinquish memory in a graceful manner. For example, only the necessary amount of data is moved to the auxiliary storage, rather than moving the entire table, which could cause a large performance impact. This spilling improves processing speed by keeping portions of a hash table in memory, reduces transfer time by only moving portions of the hash table from memory as opposed to the entire table, and makes efficient use of existing memory. In some embodiments, the cost of LIFO spilling is proportional to the number of rows being spilled.

FIG. 1 is a block diagram illustrating an embodiment of a network system. In some embodiments, the network system of FIG. 1 comprises a system for LIFO based spilling for grouping aggregation. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and database system 106 communicate via network 100.

User system 102 comprises a user system for use by a user. For example, user system 102 comprises a system for communication, data access, computation, etc. A user uses user system 102 to access database system commands utilizing database system 106—for example, to add data, remove data, modify data, process data, execute database queries, etc. The plurality of node systems of FIG. 1 comprise a cluster-based database system for storing database data (e.g., large amounts of database data, big data, etc.), processing database commands, determining computation values, executing queries, etc.

Administrator system 104 comprises an administrator system for use by an administrator. For example, administrator system 104 comprises a system for communication, data access, computation, etc. An administrator uses administrator system 104 to maintain database system 106. For example, an administrator uses administrator system 104 to start and/or stop services on database system 106, to reboot database system 106, to install software on database system 106, to add, modify, and/or remove data on database system 106, etc.

Database system 106 comprises a database system for storing data, executing queries on data, providing query results, etc. In various embodiments, database system 106 comprises a single computer, a plurality of computers, a cluster system, a plurality of virtual machines, etc. For example, database system 106 comprises an interface configured to receive an indication to perform a GROUP BY operation, wherein the indication comprises an input table and a grouping column, and a processor configured to, for each input table entry of the input table, determine a key, wherein the key is based at least in part on the grouping column (e.g., the operation is GROUP BY a—the grouping key is {a}; the operation is GROUP BY a,b—the grouping key is {a,b}, etc.), add the key to a grouping hash table, wherein adding the key to the grouping hash table comprises LIFO spilling when necessary, create an output table based at least in part on the grouping hash table, and provide the output table.

Figure 2:
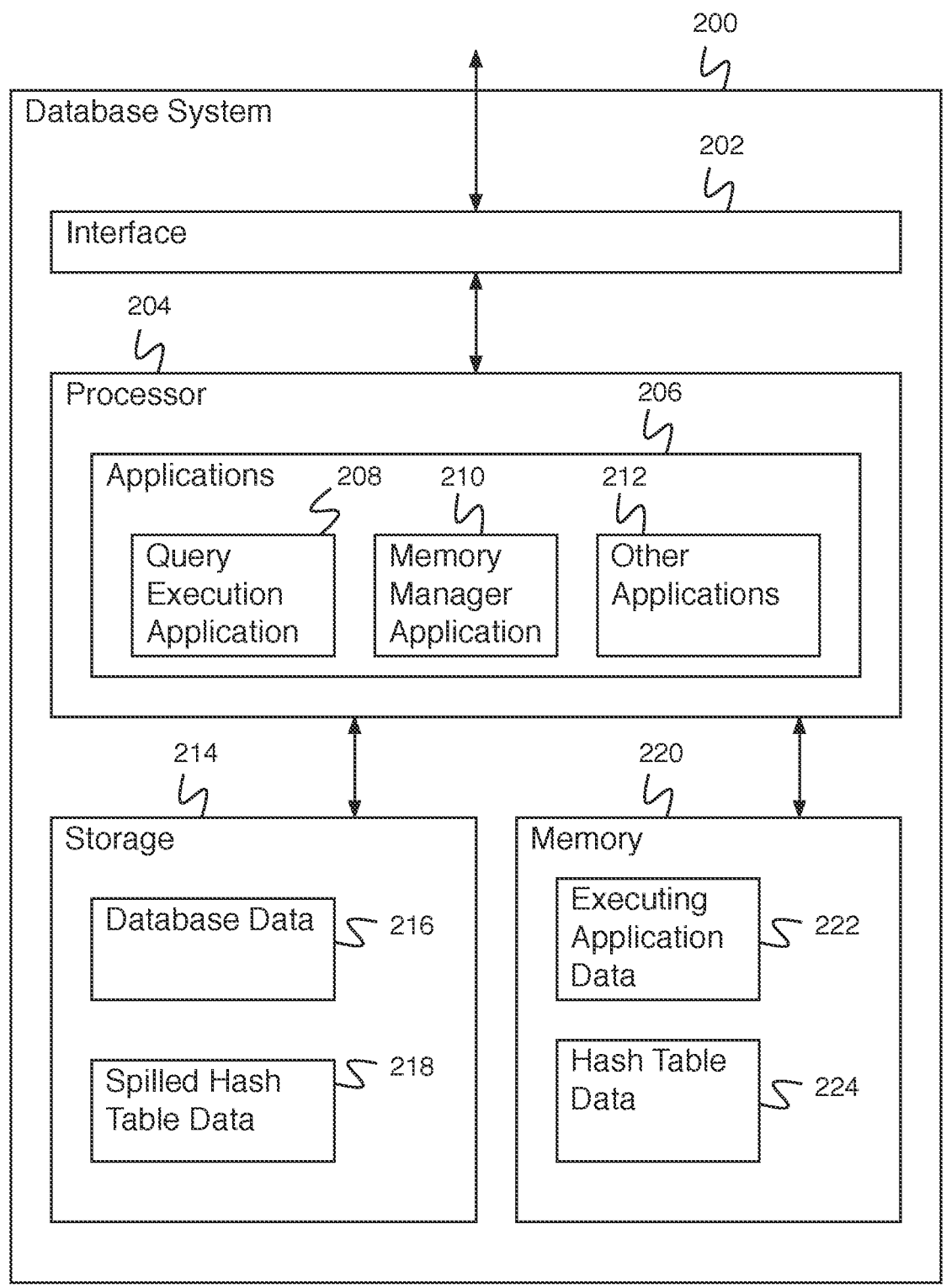
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, database system 200 comprises interface 202. For example, interface 202 comprises an interface for receiving data, providing data, receiving a request to delete or modify data, receiving a database query, receiving an indication to perform a GROUP BY operation, providing a database query response, receiving an indication to spill data, etc. Processor 204 comprises a processor for executing applications 206. Applications 206 comprises query execution application 208, memory manager application 210, and other applications 212. Query execution application 208 comprises an application for executing a database query (e.g., a SQL query) on stored data (e.g., database data 216). For example, query execution application 208 comprises an application configured to, for each input table entry of an input table, determine a key, wherein the key is based at least in part on the input table entry and the grouping column, add the key to a grouping hash table, wherein adding the key to the grouping hash table comprises LIFO spilling when necessary, create an output table based at least in part on the grouping hash table, and provide the output table. In some embodiments, query execution application 208 comprises an application for executing a database query wherein memory for the database query is managed by a memory manager (e.g., memory manager application 210). Memory manager application 210 comprises an application for receiving a request for a memory allocation, determining whether memory is available, providing a memory allocation, determining a process to relinquish memory, providing a request to relinquish memory, etc. Other applications 212 comprise any other appropriate applications (e.g., an index maintenance application, a communications application, a chat application, a web browser application, a document preparation application, a report preparation application, a user interface application, a data analysis application, etc.). Storage 214 comprises database data 216 (e.g., a stored data set, a portion of a stored data set, data for executing a query) and spilled hash table data 218 (e.g., hash table data moved from memory 220 to storage 214 as the result of a request from memory manager application 210 to relinquish memory). Memory 220 comprises executing application data 222 comprising data associated with applications 206 and hash table data 224 comprising hash tables created by query execution application 208.

FIG. 3 is a diagram illustrating an embodiment of a GROUP BY query. In the example shown, table 300 comprises an input data table. Table 300 comprises a set of rows, each row comprising data for the columns "Country," "State/Province," "City," and "Color." A GROUP BY (State/Province) command is run to execute a GROUP BY command using the State/Province column as key. Table 302 comprises the output table resulting from the GROUP BY (State/Province) command. Two columns are present in table 302, a "State/Province" column representing all of the unique entries in the "State/Province" column of table 300, and a "Count" column representing the number of rows of table 300 the corresponding value for the "State/Province" column appeared in.

Figure 4:
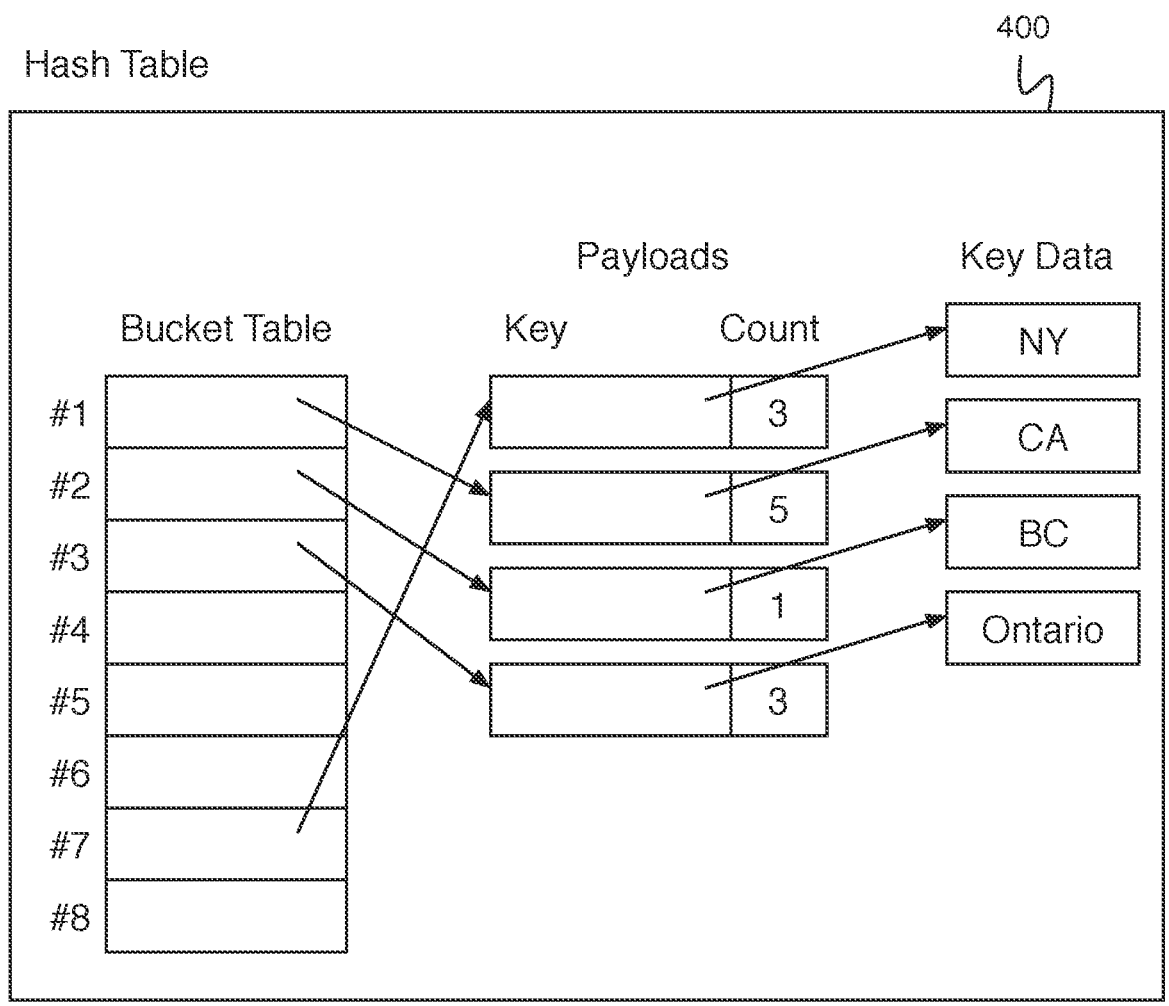
FIG. 4 is a diagram illustrating an embodiment of a hash table.

FIG. 4 is a diagram illustrating an embodiment of a hash table. Hash table 400 comprises a bucket table, a set of payloads, and a set of key data. The bucket table comprises a set of numbered buckets. Pointer data is inserted into buckets of the bucket table pointing to payloads of the set of payloads. When a data table row is inserted into hash table 400, a bucket is determined based at least in part on a hash of a key (e.g., the key comprises the data value from the data table of the grouping column in the inserted row; the bucket comprises a hash of the key modulo the number of buckets, etc.). A pointer is inserted into the determined bucket pointing to a payload of the set of payloads representing the bucket (e.g., comprising the key data and a count value of 1). In the event the determined bucket is already filled, the key of the referenced payload is checked to determine if it matches the key of the row being inserted; in the event the keys match, the associated count is incremented, and the insertion process is complete. In the event the keys do not match, the process steps to the next bucket of the bucket table and repeats the checking process, continuing until an empty bucket or a matching key is found. In some embodiments, the next bucket is determined according to a probing strategy. Payloads of the set of payloads are stored in an ordered structure (e.g., an array, a linked list, etc.) such that the most recently added payload can be identified and removed if necessary. Key data is stored separately from the payload itself, referenced by a pointer stored in the payload. In some embodiments, the key data is stored inline with the payload and not separately. For example, fixed-length keys such as integers, float, are stored directly inline. As another example, strings are stored such that a fixed-length portion (length and pointer) inline, but the actual string data is out-of-line in separate memory pool.

To summarize the process flows below, aggregation is described in the flow diagram of FIG. 5. Row-by-row aggregation with LIFO spilling is described in three figures: a) FIG. 6, which provides an overview of aggregation; b) FIG. 7, which describes a resizing procedure; and c) FIG. 8, which describes a LIFO spilling procedure. Batched aggregation with LIFO spilling is described in: a) the paragraph following the description of FIG. 9A, which introduces the concept of partially ordered partitions; b) FIG. 9A, which provides an overview of batched aggregation; c) FIG. 9B, which describes a batched resizing procedure; and d) FIG. 11B, which describes a batched LIFO spilling procedure.

Figure 5:
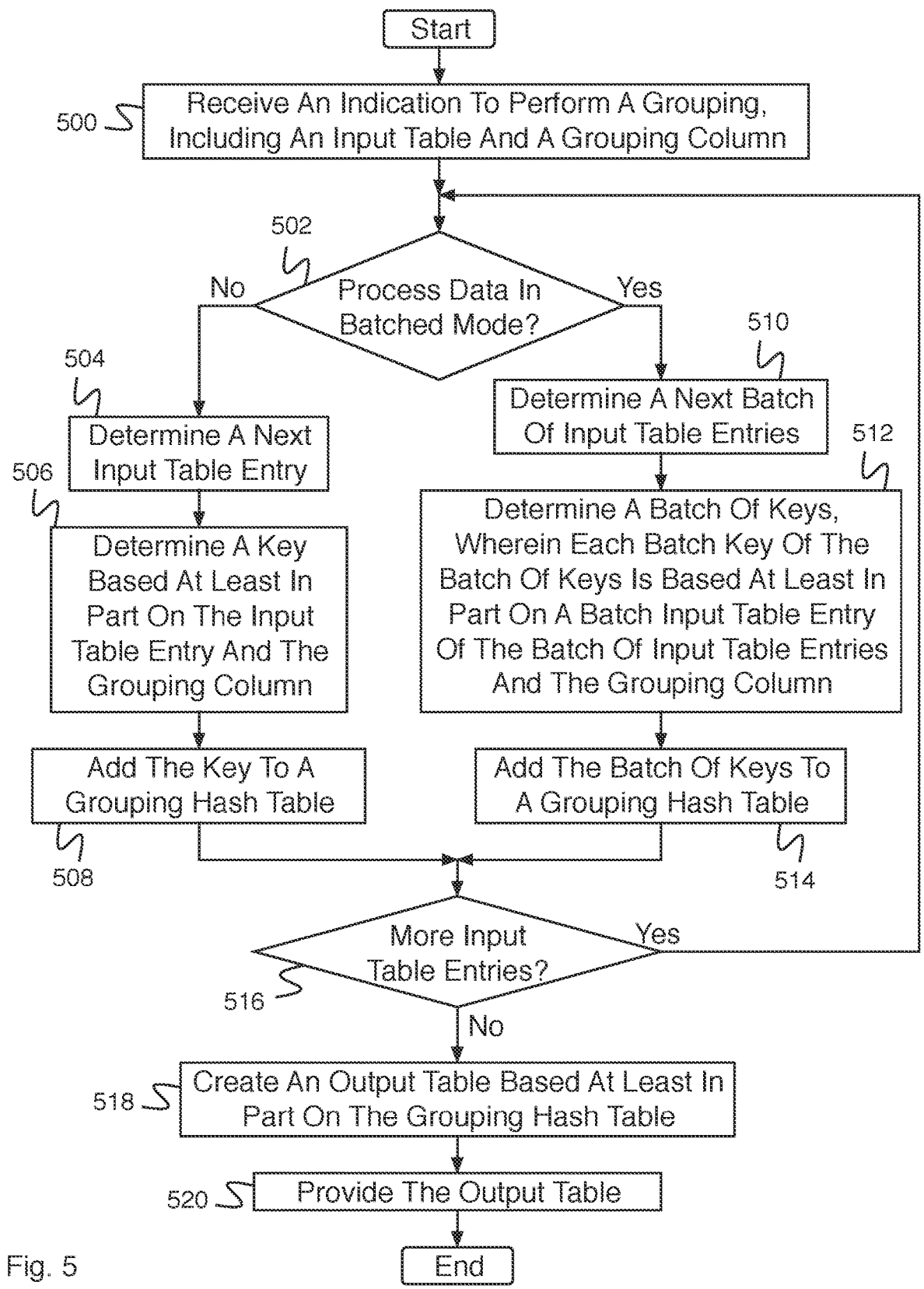
FIG. 5 is a flow diagram illustrating an embodiment of a process for performing a grouping with optional aggregation.

FIG. 5 is a flow diagram illustrating an embodiment of a process for performing a grouping or aggregation. In some embodiments, the process of FIG. 5 is performed by database system 106 of FIG. 1. In the example shown, in 500, an indication is received to perform a grouping, including an input table and a grouping column. In 502 it is determined whether to process data in batched mode. For example, processing data in batched mode comprises processing input table entries in batches. In the event it is determined not to process data in batched mode, control passes to 504. In 504, a next input table entry is determined. In some embodiments, the next input table entry comprises the first input table entry. In 506, a key is determined based at least in part on the input table entry and the grouping column. For example, the key comprises the value of the input table entry in the grouping column. In 508, the key is added to a grouping hash table. Control then passes to 516. In the event it is determined in 502 to process data in batched mode, control passes to 510. In 510, a next batch of input table entries is determined. In some embodiments, the next batch of input table entries comprises the first batch of input table entries. In 512, a batch of keys is determined, wherein each key of the batch of keys is based at least in part on a batch input table entry of the batch of input table entries and the grouping column. In 514, the batch of keys is added to a grouping hash table. In some embodiments, the batch of keys is added using processing that is based at least in part on an aggregation function. In 516, it is determined whether there are more input table entries. In the event it is determined that there are more input table entries, control passes to 502. In the event it is determined that there are not more input table entries, control passes to 518. In 518, an output table is created based at least in part on the grouping hash table. In 520, the output table is provided.

Figure 6:
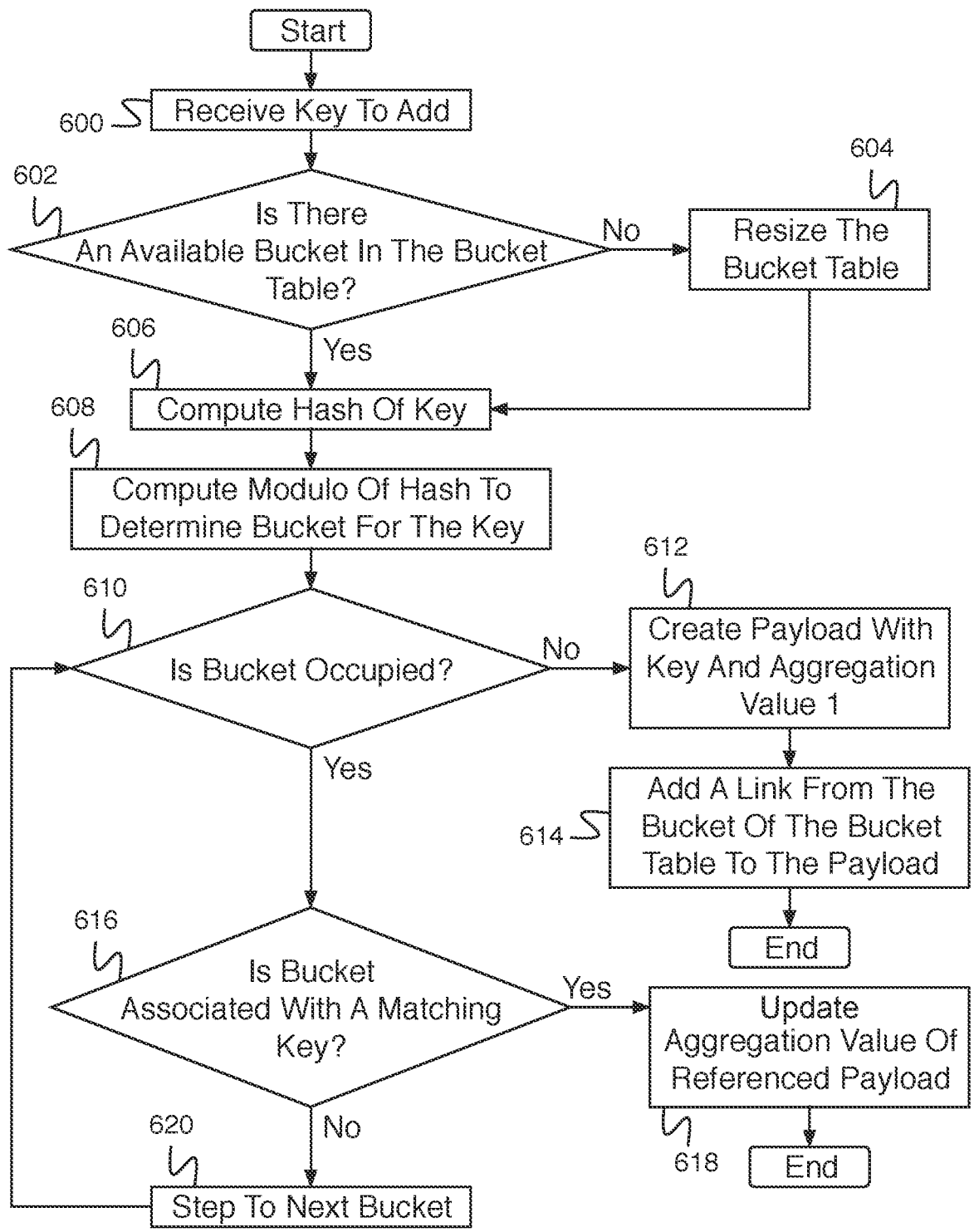
FIG. 6 is a flow diagram illustrating an embodiment of a process for adding a key to a grouping hash table.

FIG. 6 is a flow diagram illustrating an embodiment of a process for adding a key to a grouping hash table. In some embodiments, the process of FIG. 6, which provides an overview of an aggregation process, implements 508 of FIG. 5. In the example shown, in 600, a key to add is received. In 602, it is determined whether there is an available bucket in the bucket table. In the event it is determined that there is an available bucket in the bucket table, control passes to 606. In the event it is determined that there is not an available bucket in the bucket table, control passes to 604. In 604, the bucket table is resized. In 606, a hash of the key is computed. In 608, a modulo of the hash is computed to determine the bucket for the key. For example, computing the modulo of the hash to determine the bucket for the key comprises determining a bucket of a bucket table based at least in part on a hash of the key. In 610, it is determined whether the bucket is occupied. In the event it is determined that the bucket is not occupied, control passes to 612. In 612, a payload is created with the key and aggregation value 1. For example, the payload comprises a pointer to the key data stored in another location. In some embodiments, the payload is added to a payload data structure (e.g., an array, a linked list, etc.). In 614, a link is added from the bucket of the bucket table to the payload, and the process ends. In the event it is determined in 610 that the bucket is occupied, control passes to 616. In 616, it is determined whether the bucket is associated with a matching key. For example, a key associated with the bucket is determined by accessing the payload referenced by the bucket and accessing the key data referenced by the payload. In the event it is determined that the bucket is associated with a matching key, control passes to 618. In 618, the aggregation value of the referenced payload is updated, and the process ends. In the event it is determined in 616 that the bucket is not associated with a matching key, control passes to 620. In 620, the process steps to the next bucket. In some embodiments, stepping to the next bucket comprises stepping from the last bucket to the first bucket. Control then passes to 610.

In various embodiments, the steps of FIG. 6 are executed in a different order in order to achieve the same result or any appropriate order.

Figure 7:
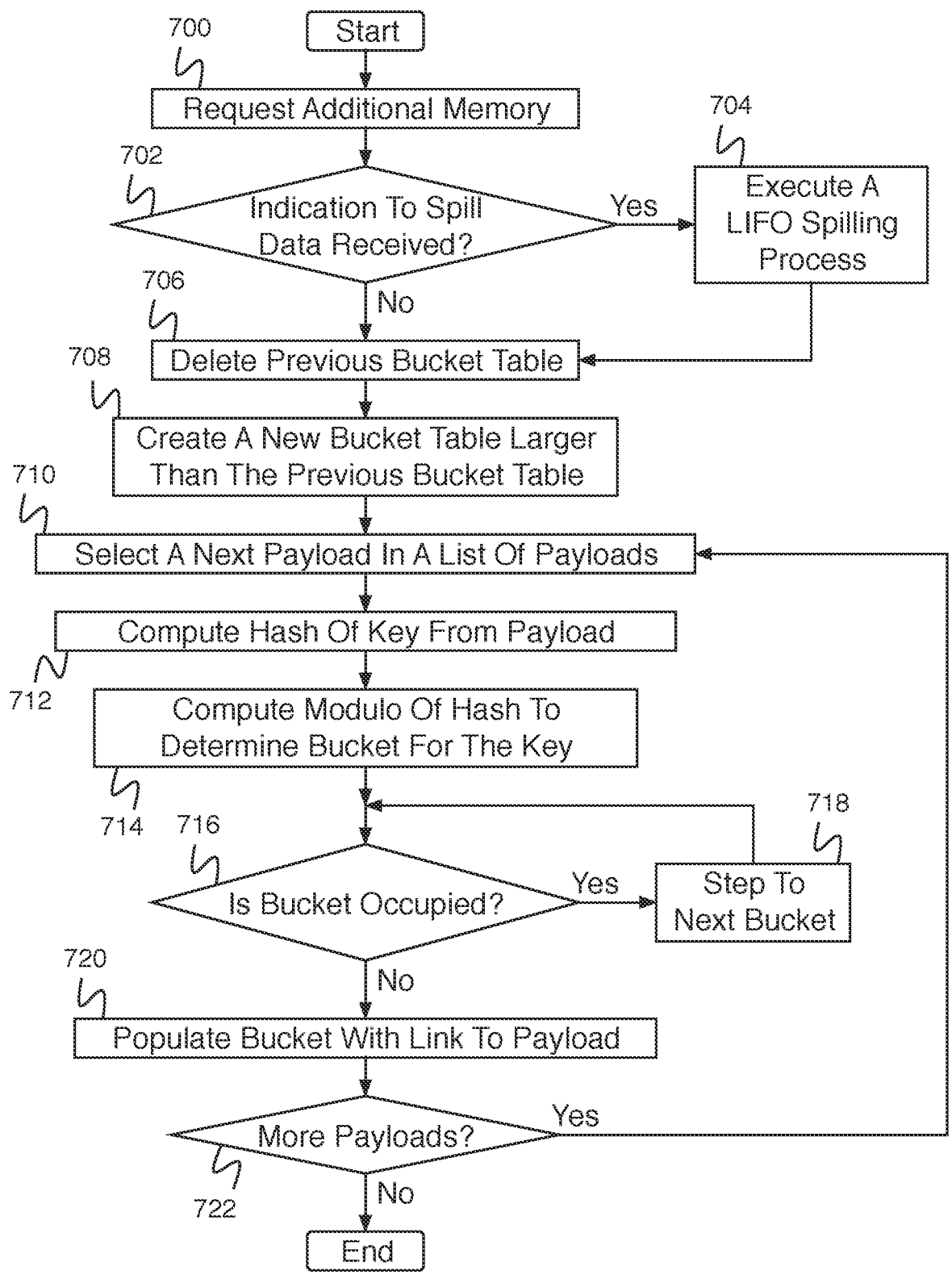
FIG. 7 is a flow diagram illustrating an embodiment of a process for resizing a bucket table.

FIG. 7 is a flow diagram illustrating an embodiment of a process for resizing a bucket table. In some embodiments, the process of FIG. 7, which describes a resizing procedure, implements 604 of FIG. 6. In the example shown, in 700, additional memory is requested. For example, a request for additional memory is provided to a memory manager. In 702, it is determined whether an indication to spill data is received (e.g., from the memory manager, in response to the request for additional memory). In the event it is determined that an indication to spill data is not received, control passes to 706. In the event it is determined in 702 that an indication to spill data is received, control passes to 704. In 704, a LIFO spilling process is executed. In 706, a previous bucket table is deleted. In 708, a new bucket table larger than the previous bucket table is created. For example, the new bucket table is double the size of the previous bucket table. In 710, a next payload is selected in a list of payloads. For example, the list of payloads comprises a payload data structure for storing a set of payloads (e.g., an array, a linked list, etc.). In 712, a hash of the key from the payload is computed. In 714, the modulo of the hash is computed to determine a bucket for the key. In 716, it is determined whether the bucket is occupied. In the event it is determined that the bucket is occupied, control passes to 718. In 718, the process steps to the next bucket. Control then passes to 716. In the event it is determined in 716 that the bucket is not occupied, control passes to 720. In 720 the bucket is populated with a link to the payload. In 722, it is determined whether there are more payloads. In the event it is determined that there are more payloads, control passes to 710. In the event it is determined that there are not more payloads, the process ends.

In some embodiments, after LIFO spilling in the process of FIG. 7, the previous bucket table is not deleted, and instead the bucket entries for the spilled payloads are deleted, where this deletion is made easy by the LIFO ordering. After LIFO spilling, the memory conditions are checked. In response to the memory condition being to still need more memory, the system request for more memory to become available. In response to the memory condition being to not need more memory, the system cancels the request for more memory.

Figure 8:
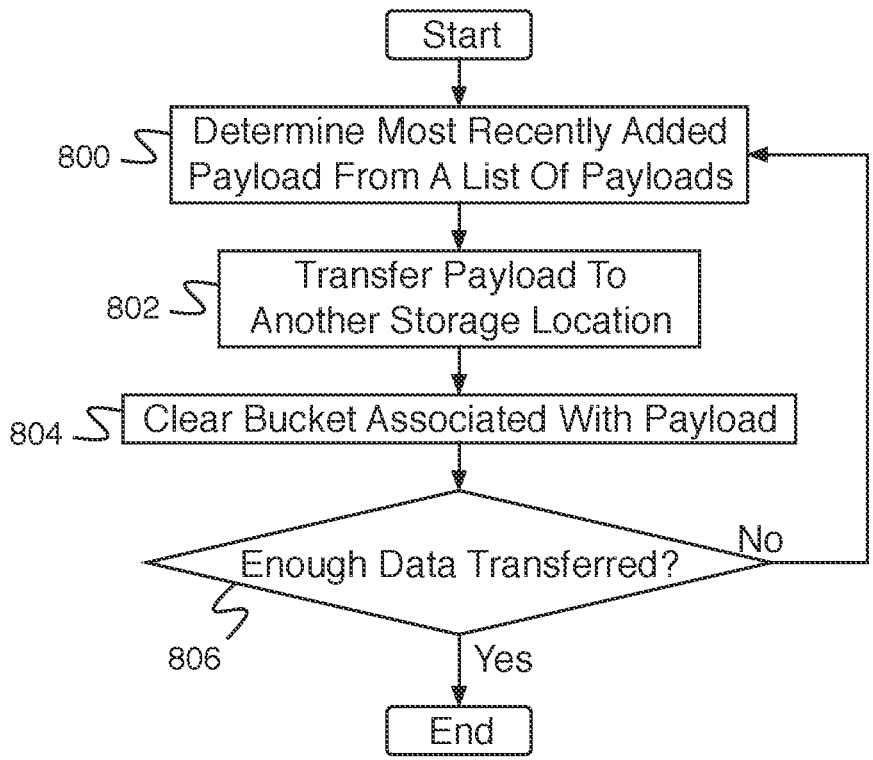
FIG. 8 is a flow diagram illustrating an embodiment of a process for LIFO spilling.

FIG. 8 is a flow diagram illustrating an embodiment of a process for LIFO spilling. In some embodiments, the process of FIG. 8, which describes a LIFO spilling procedure, implements 704 of FIG. 7. In the example shown, in 800, a most recently added payload is determined from a list of payloads. In 802, the payload is transferred to another storage location. For example, the payload is transferred to a hard disk, to another system, etc. In 804, the bucket associated with the payload is cleared. In some embodiments, the bucket associated with the payload is not cleared (e.g., 804 is not necessary in a process where the bucket table is immediately removed after performing the LIFO spilling process). In 806, it is determined whether enough data has been transferred. For example, determining whether enough data has been transferred comprises comparing the total data size of payloads transferred to another storage location in 802 to a requested data spill amount (e.g., received associated with an indication to spill data). In the event it is determined in 806 that enough data has not been transferred, control passes to 800. In the event it is determined in 806 that enough data has been transferred, the process ends.

Figure 9A:
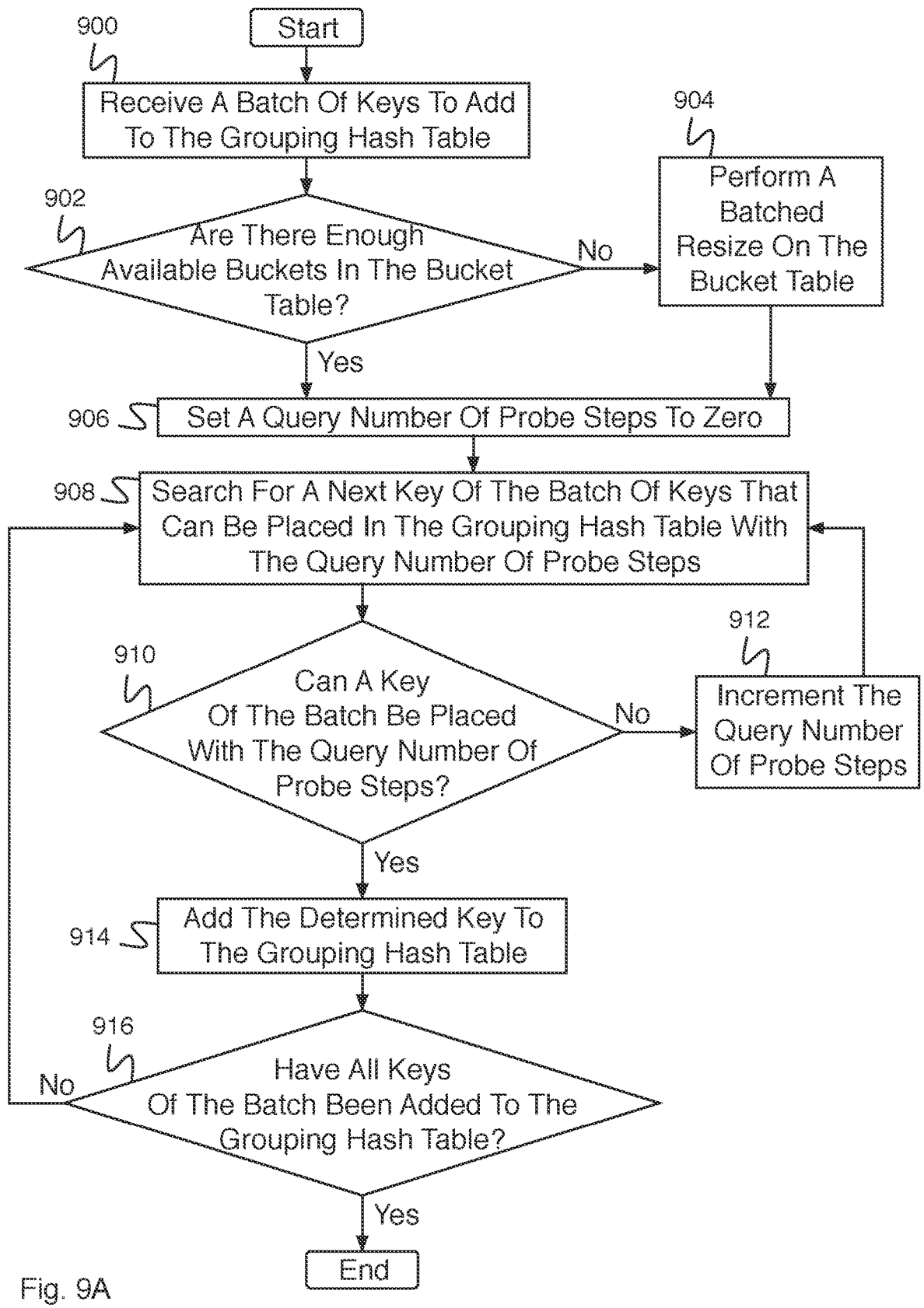
FIG. 9A is a flow diagram illustrating an embodiment of a process for adding a batch of keys to a grouping hash table.

FIG. 9A is a flow diagram illustrating an embodiment of a process for adding a batch of keys to a grouping hash table. In some embodiments, the process of FIG. 9A, which provides an overview of batched aggregation, implements 514 of FIG. 5. In the example shown, in 900, a batch of keys is received to add to the grouping hash table. In 902, it is determined whether there are enough available buckets in the bucket table. In the event it is determined that there are enough buckets in the bucket table, control passes to 906. In the event it is determined that there are not enough buckets in the bucket table, control passes to 904. In 904, a batched resize operation is performed on the bucket table. In 906, a query number of probe steps is set to zero. In 908, the process searches for a next key of the batch of keys that can be placed in the grouping hash table with the query number of steps. In 910, it is determined whether a key of the batch can be placed with the query number of steps (e.g., whether a key was found in the search process of 908). In the event it is determined that no key of the batch can be placed with the query number of steps, control passes to 912. In 912, the query number of probe steps is incremented. Control then passes to 908. In the event it is determined in 910 that a key of the batch can be placed with the query number of probe steps, control passes to 914. In 914, the determined key is added to the grouping hash table. For example, the determined key is added to the grouping hash table using the process of FIG. 6. In 916, it is determined whether all keys of the batch have been added to the grouping hash table. In the event it is determined that not all keys of the batch have been added to the grouping hash table, control passes to 908. In the event it is determined that all keys of the batch have been added to the grouping hash table, the process ends.

In some embodiments, the concept of partially ordered partitions is used to create a more efficient implementation of the system. Before starting the aggregation, an ordered partitioning strategy is determined for the payloads such that all rows in a partition p1 precede all rows in partition p2 in LIFO order. These partitions are referred to as partially LIFO ordered. The rows within each partition may or may not be in LIFO order. In particular, batched reinsertion of payloads during hash-table resizes can lead to a logical reordering of the payloads (the payloads do not need to be copied to a different physical location). In some embodiments, there is a natural partitioning based on storing payloads in linked-list of memory chunks. The chunk boundaries form natural partition boundaries.

In some embodiments, resizing a bucket table comprises constructing a new batch for reinsertion into a new bucket structure based at least in part on payloads of a selected partition in a partition order, wherein the partition order is such that rows in a first partition precede all rows in a second partition in a last-in-first-out order of an original insertion into the grouping hash table.

In some embodiments, executing batched last in first out spilling uses a partition order, wherein the partition order is such that rows in a first partition precede all rows in a second partition in a last-in-first-out order of an original insertion into the grouping hash table.

Figure 9B:
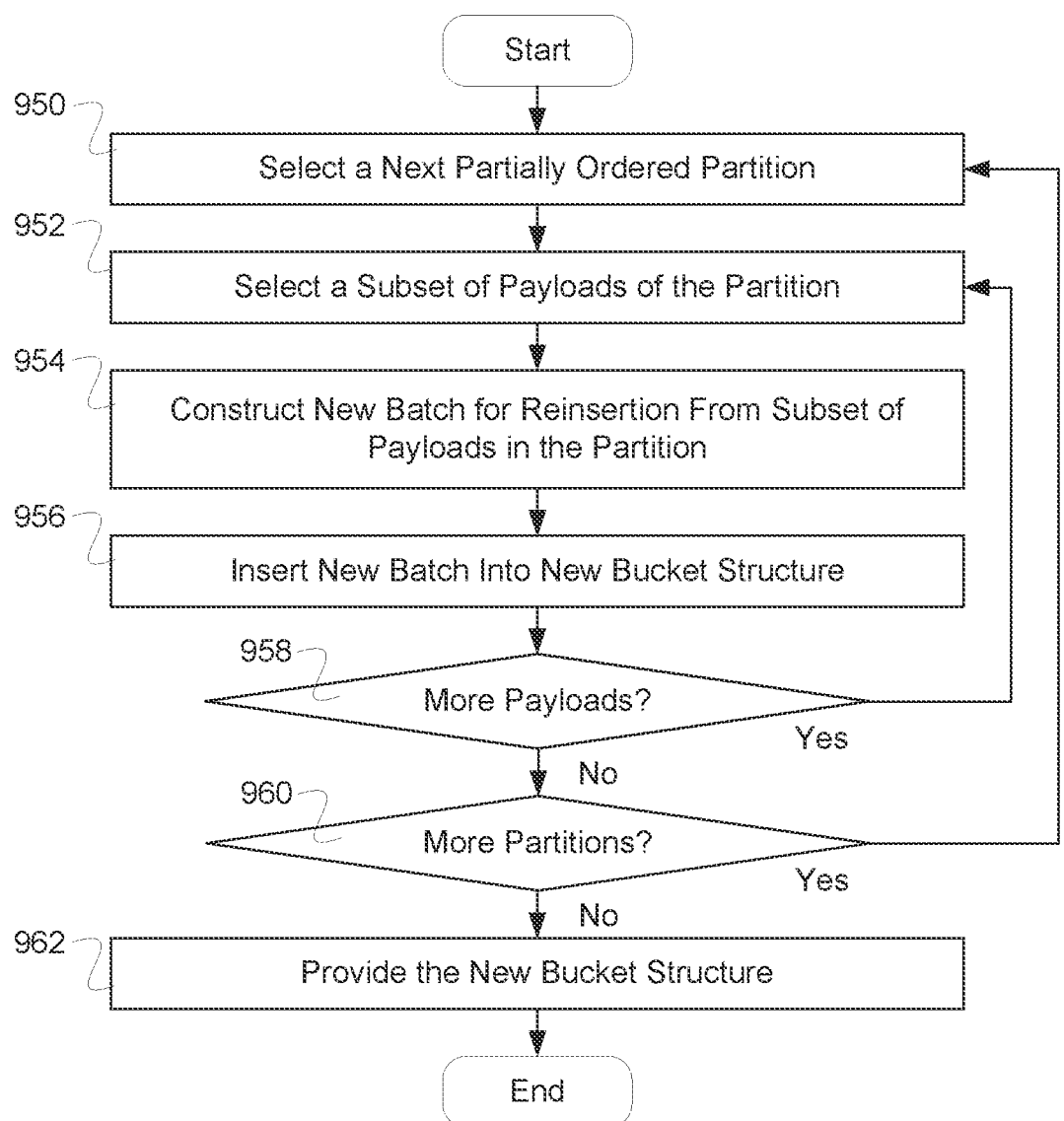
FIG. 9B is a flow diagram illustrating an embodiment of a process for performing a batched resize on the bucket table.

FIG. 9B is a flow diagram illustrating an embodiment of a process for performing a batched resize on the bucket table. In some embodiments, the process of FIG. 9B, which describes a batched resizing procedure, is used to implement 904 of FIG. 9A. In the example shown, in 950 a next partially ordered partition is selected. In 952, a subset of payloads of the partition is selected. In 954, a new batch is constructed for reinsertion from the subset of payloads in the partition. For example, resizing the bucket table comprises constructing a new batch for reinsertion into a new bucket structure based at least in part on payloads of a selected partition in a partition order, wherein the partition order is such that rows in a first partition precede all rows in a second partition in a last-in-first-out order of the original insertion into the grouping hash table. In 956, new batch is inserted into the new bucket structure. In 958, it is determined whether there are more payloads. In response to there being more payloads, control passes to 952. In response to there not being more payloads, control passes to 960. In 960, it is determined whether there are more partitions. In response to there being more partitions, control passes to 950. In response to there not being more partitions, control passes to 962. In 962, the new bucket structure is provided, and the process ends. In some embodiments, more efficient batched LIFO spilling (as opposed to the non-batched LIFO spilling) requires careful coordination of the resizing and LIFO spilling procedures via this concept of ordered partitions. Also, there exists at least one practical implementation that stores payloads as a linked-list of memory chunks that form natural partition boundaries.

Figure 10A:
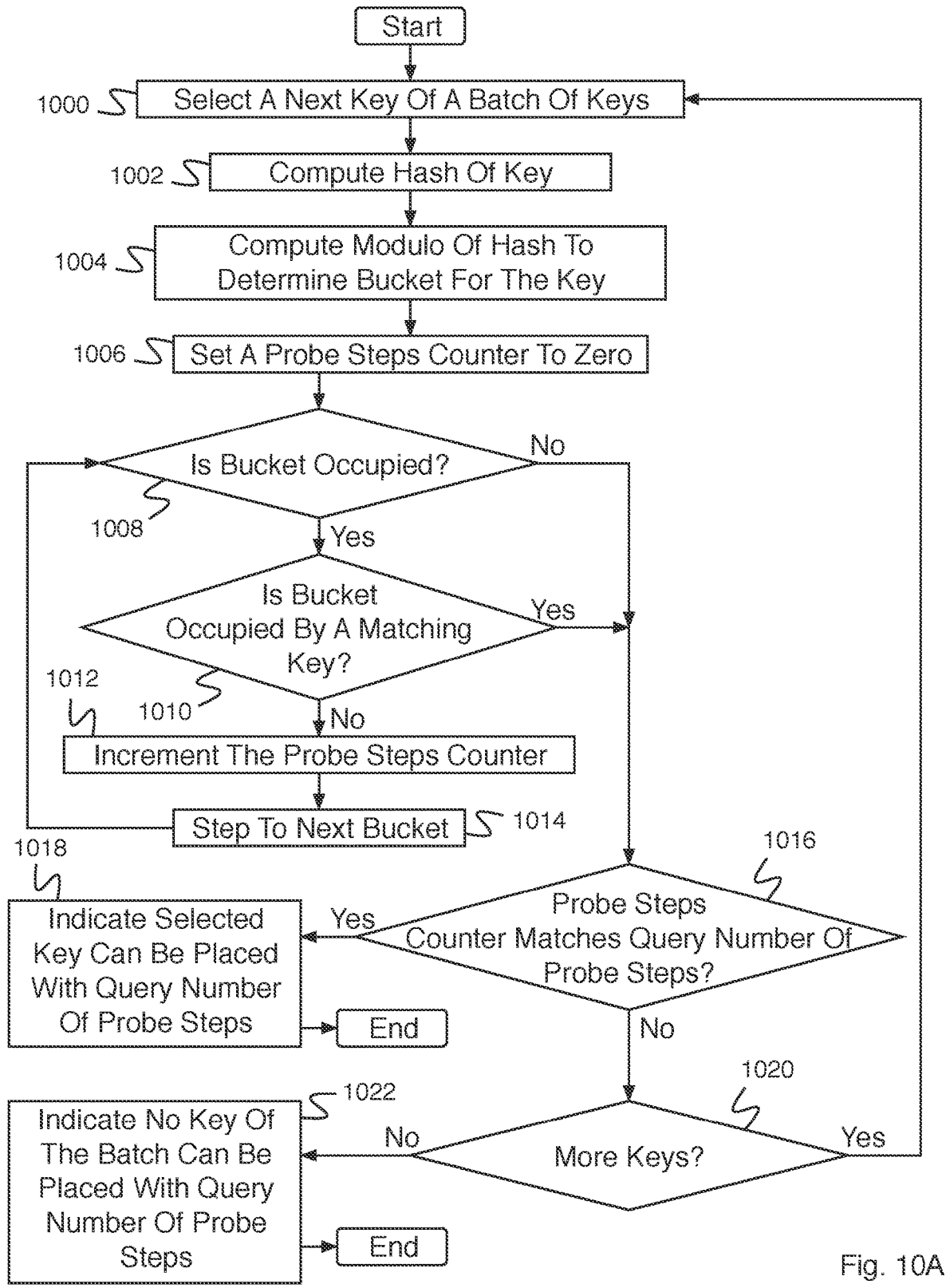
FIG. 10A is a flow diagram illustrating an embodiment of a process for searching for a next key of a batch of keys that can be placed in a grouping hash table with a query number of probe steps.

FIG. 10A is a flow diagram illustrating an embodiment of a process for searching for a next key of a batch of keys that can be placed in a grouping hash table with a query number of probe steps. In some embodiments, the process of FIG. 10A implements 908 of FIG. 9A. In the example shown, in 1000, a next key of a batch of keys is selected. In 1002, a hash of the key is computed. In 1004, a modulo of the hash is computed to determine a bucket for the key. In 1006, a probe steps counter is set to zero. In 1008, it is determined whether the bucket is occupied. In the event it is determined that the bucket is not occupied, control passes to 1016. In the event it is determined that the bucket is occupied, control passes to 1010. In 1010, it is determined whether the bucket is occupied by a matching key (e.g., whether the bucket is occupied by a pointer referencing a payload associated with a matching key). In the event it is determined that the bucket is not occupied by a matching key, control passes to 1012. In 1012, the probe steps counter is incremented. In 1014, the process steps to the next bucket. Control then passes to 1008. In the event it is determined in 1010 that the bucket is occupied by a matching key, control passes to 1016. In 1016, it is determined whether the probe steps counter matches the query number of probe steps. In the event it is determined that the probe steps counter matches the query number of probe steps, control passes to 1018. In 1018, the process indicates the selected key can be placed with the query number of probe steps, and the process ends. In the event it is determined in 1016 that the probe steps counter does not match the query number of probe steps, control passes to 1020. In 1020, it is determined whether there are more keys. In the event it is determined that there are more keys, control passes to 1000. In the event it is determined that there are not more keys, control passes to 1022. In 1022, the process indicates that no key of the batch can be placed with the query number of probe steps.

In some embodiments, the process of FIG. 10A performs some of the steps in batches. For example, the hashes for all keys are processed in bulk. Then the corresponding buckets are computed for the entire batch.

Figure 10B:
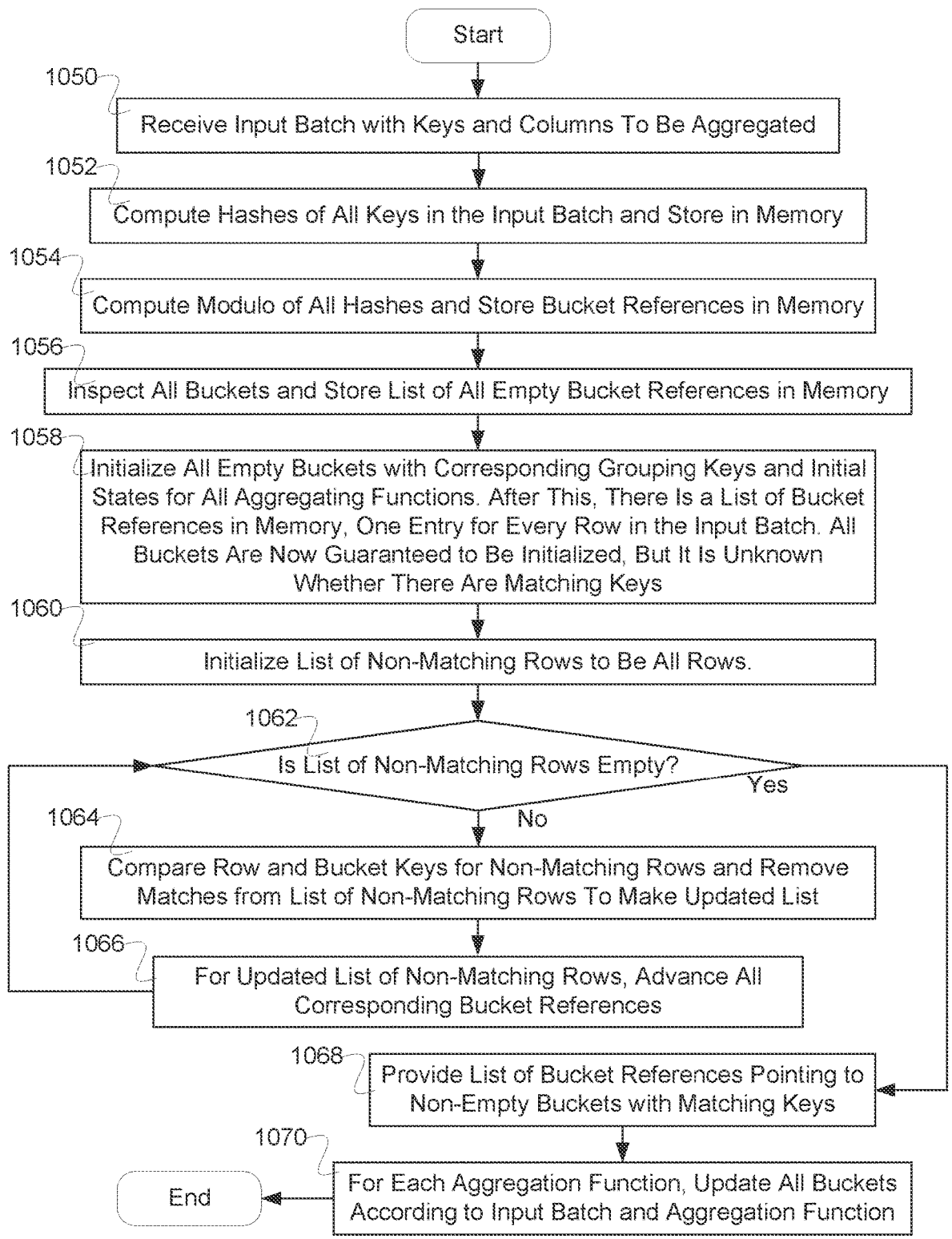
FIG. 10B is a flow diagram illustrating an embodiment of a process for aggregating a batch of keys and columns into a grouping hash table.

FIG. 10B is a flow diagram illustrating an embodiment of a process for aggregating a batch of keys and columns into a grouping hash table. In some embodiments, the process of FIG. 10B implements 908 of FIG. 9A. In the example shown, in 1050, an input batch is received with keys and columns to be aggregated. In 1052, the hashes of all keys in the input batch are computed and are stored in memory. In 1054, the modulo of all the hashes are computed and the bucket references are stored in memory. In 1056, all buckets are inspected, and the list of all empty bucket references are stored in memory. In 1058, all empty buckets are initialized with the corresponding grouping keys and initial states for all aggregate functions. After this, there is a list of bucket references in memory, one entry for every row in the input batch. All buckets are now guaranteed to be initialized, but it is unknown whether there are matching keys. In 1060, a list of non-matching rows is initialized to be all of the rows. In 1062, it is determined whether the list of non-matching rows is empty. In response to determining that the list of non-matching rows is empty, control passes to 1068. In response to determining that the list of non-matching rows is not empty, control passes to 1064. In 1064, row and bucket keys are compared for non-matching rows and matches are removed from the list of non-matching rows to make an updated list. In 1066, for an updated list of non-matching rows, all corresponding bucket references are advanced. For example, the corresponding bucket references are advanced according to the chosen collision-resolution strategy. In 1068, a list of bucket references pointing to non-empty buckets with matching keys is provided. In 1070, for each aggregation function, all buckets are updated according to the input batch and the aggregation functions. For example, for a SUM(c) aggregation function aggregating an input column c, the value c[i] is added (in the arithmetic sense) to the corresponding aggregation buffer belonging to bucket[i] for every row i in the input batch.

Figure 11A:
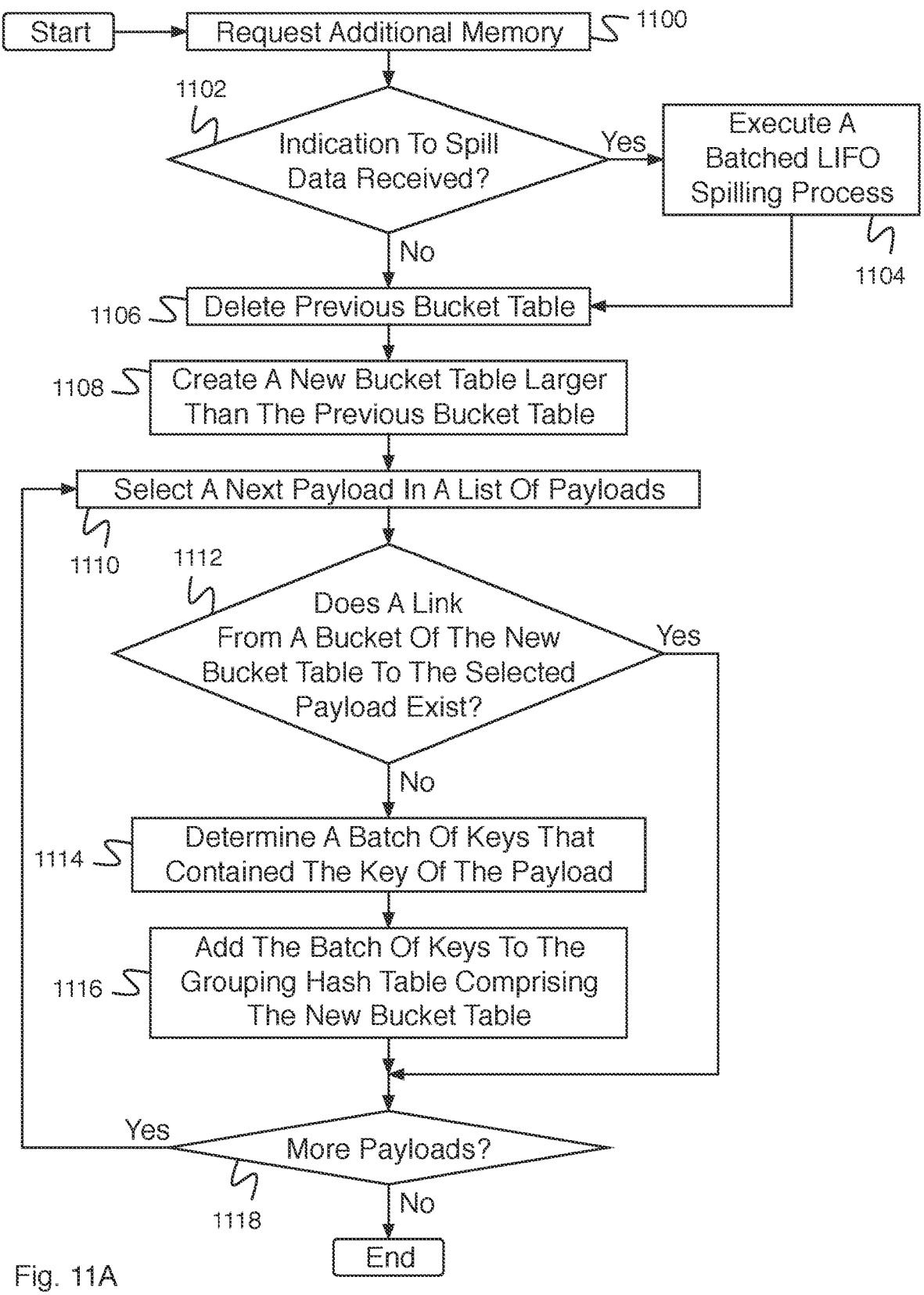
FIG. 11A is a flow diagram illustrating an embodiment of a process for performing a batched resize on a bucket table.

FIG. 11A is a flow diagram illustrating an embodiment of a process for performing a batched resize on a bucket table. In some embodiments, the process of FIG. 11A implements 904 of FIG. 9A. In the example shown, in 1100, additional memory is requested. For example, a request for additional memory is provided to a memory manager. In 1102, it is determined whether an indication to spill data is received (e.g., from the memory manager, in response to the request for additional memory). In the event it is determined that an indication to spill data is not received, control passes to 1106. In the event it is determined in 1102 that an indication to spill data is received, control passes to 1104. In 1104, a batched LIFO spilling process is executed. In 1106, a previous bucket table is deleted. In 1108, a new bucket table larger than the previous bucket table is created. For example, the new bucket table is double the size of the previous bucket table. In 1110, a next payload in a list of payloads is selected. In 1112, it is determined whether a link from a bucket of the new bucket table to the selected payload exists (e.g., whether the selected payload has already been added to the new bucket table). In the event it is determined that a link from a bucket of the new bucket table to the selected payload exists, control passes to 1118. In the event it is determined that a link from a bucket of the new bucket table to the selected payload does not exist, control passes to 1114. In 1114, a batch of keys that contained the key of the payload is determined (e.g., the batch of keys that the key of the payload was a part of when the key was initially added to the hash table). In 1116, the batch of keys is added to the grouping hash table comprising the new bucket table. In some embodiments, the batch of keys is added using the process of FIG. 9A. In 1118, it is determined whether there are more payloads. In the event it is determined that there are more payloads, control passes to 1110. In the event it is determined that there are not more payloads, the process ends.

In some embodiments, the process of batched re-insertion of records into the bucket structure during resizing is carefully coordinated with the LIFO spilling process, as follows. The main challenge is that batched re-insertion may not preserve the original LIFO order of the payload records, violating the fundamental assumption that LIFO spilling relies on. To facilitate bulk processing, the payload records are partitioned into partially LIFO-ordered batches such that for any two batches b1, b2, if b1 precedes b2 in the partial ordering then all records in b1 precede all records in b2 in the original total LIFO order. When hash-table resizing is performed, records are reinserted a batch-at-a-time, never crossing batch boundaries. This preserves the partial LIFO ordering, but records within a batch may not be LIFO ordered anymore. When LIFO spilling is performed, spill data must likewise be spilled in batches, obeying the same batch boundaries as the resizing process. Intuitively, the solution can be thought of as a batched LIFO ordering where all of the ideas and guarantees previously discussed apply to batches instead of individual payload records. In some embodiments, the batch boundaries might naturally arise due to chunked memory allocation where payloads are stored in a list of fixed-size memory chunks.

Figure 11B:
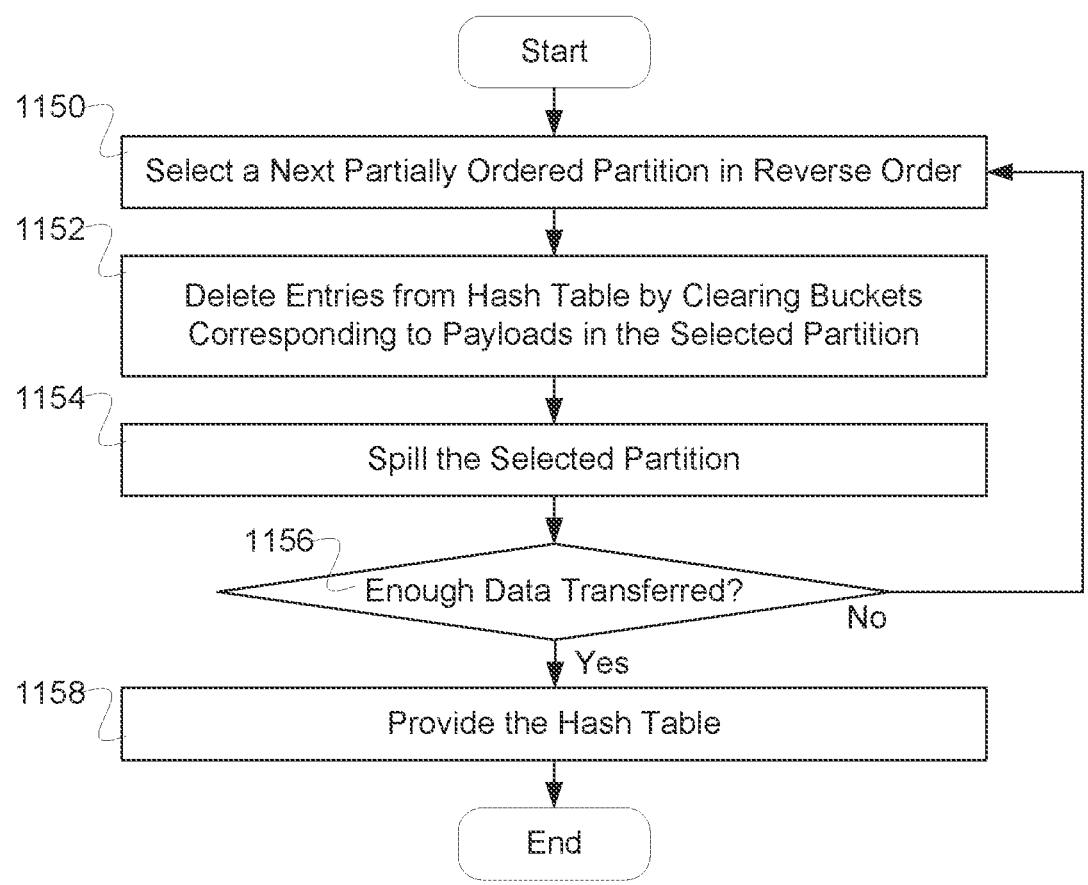
FIG. 11B is a flow diagram illustrating an embodiment of a process for batched spilling.

FIG. 11B is a flow diagram illustrating an embodiment of a process for batched spilling. In some embodiments, the process of FIG. 11B, which describes a batched LIFO spilling procedure, is used to implement 1104 of FIG. 11A. In the example shown, in 1150 a next partially ordered partition is selected in reverse order. In 1152, entries are deleted from the hash table by clearing buckets corresponding to payloads in the selected partition. In 1154, the selected partition is spilled. In 1156, it is determined whether enough data is transferred. In response to there not being enough data transferred, control passes to 1150. In response to there being enough data transferred, control passes to 1158. In 1158, the hash table is provided.

Figure 12:
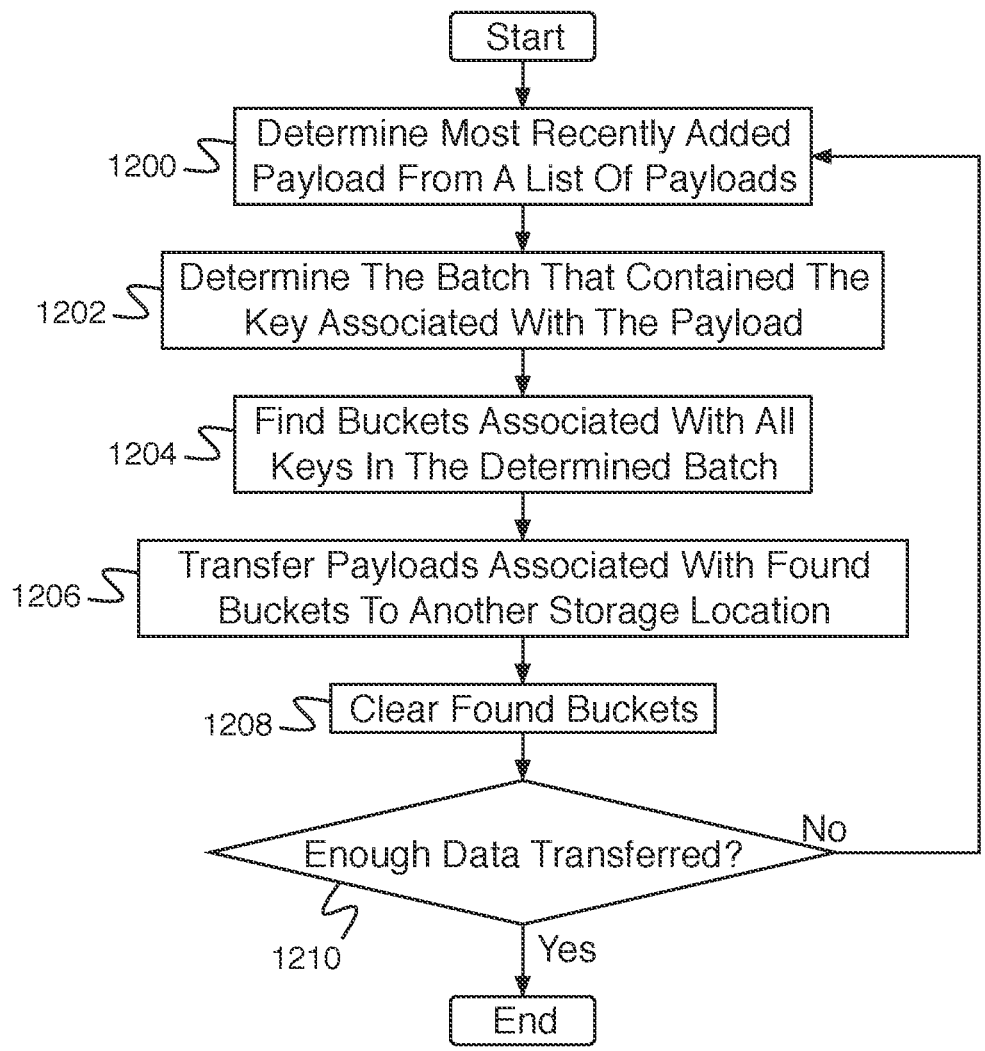
FIG. 12 is a flow diagram illustrating an embodiment of a process for batched LIFO spilling.

FIG. 12 is a flow diagram illustrating an embodiment of a process for batched LIFO spilling. In some embodiments, the process of FIG. 12 implements 1104 of FIG. 11. In the example shown, in 1200, a most recently added payload from a list of payloads is determined. In 1202, the batch that contained the key associated with the payload is determined. In 1204, buckets associated with all keys in the determined batch are found. In 1206, the payloads associated with the found buckets are transferred to another storage location. In 1208, the found buckets are cleared. In some embodiments, the found buckets are not cleared (e.g., 1208 is not necessary in a process where the bucket table is immediately removed after performing the batched LIFO spilling process). In 1210, it is determined whether enough data has been transferred. For determining whether enough data has been transferred comprises comparing the total data size of payloads transferred to another storage location in 1206 to a requested data spill amount (e.g., received associated with an indication to spill data). In the event it is determined in 1210 that not enough data has been transferred, control passes to 1200. In the event it is determined in 1210 that enough data has been transferred, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an interface configured to:
        receive an indication to perform a GROUP BY operation, wherein the indication comprises an input table and a grouping column; and
    a processor configured to:
        for each input table entry of the input table:
            determine a key, wherein the key is based at least in part on the input table entry and the grouping column;
            add the key to a grouping hash table, wherein adding the key to the grouping hash table comprises to:
                determine whether there is an available bucket for the key in a bucket table of the grouping hash table; and
                in response to a determination there is not an available bucket in the bucket table, resize the bucket, wherein resizing the bucket table comprises last in first out spilling;
        create an output table based at least in part on the grouping hash table; and
        provide the output table.

2. The system of claim 1, wherein the key comprises a value of the input table entry in the grouping column.

3. The system of claim 1, wherein adding the key to the grouping hash table comprises determining a bucket of a bucket table based at least in part on a hash of the key.

4. The system of claim 3, wherein adding the key to the grouping hash table comprises creating a payload comprising the key and an aggregation value and adding a link from the bucket of the bucket table to the payload.

5. The system of claim 3, wherein adding the key to the grouping hash table comprises incrementing an aggregation value associated with a payload referenced by the bucket of the bucket table.

6. The system of claim 1, wherein resizing the bucket table comprises constructing a new batch for reinsertion into a new bucket structure based at least in part on payloads of a selected partition in a partition order, wherein the partition order is such that rows in a first partition precede all rows in a second partition in a last-in-first-out order of an original insertion into the grouping hash table.

7. The system of claim 1, wherein resizing the bucket table comprises:
    deleting the bucket table;
    creating a new bucket table; and
    for each payload of a set of payloads:
        determining a bucket of the new bucket table based at least in part on a hash of key data of the payload; and
        populating the bucket with a link to the payload.

8. The system of claim 1, wherein resizing the bucket table comprises providing a request for additional memory.

9. The system of claim 8, wherein an indication to spill data is received in response to the request for additional memory.

10. The system of claim 9, wherein the processor is further configured to execute a last in first out spilling process in response to the indication to spill data, wherein the last in first out spilling process comprises:
    determining a most recently added payload of a set of payloads;
    transferring the most recently added payload to another storage location; and
    clearing the bucket associated with the payload.

11. The system of claim 10, wherein the last in first out spilling process is repeated until a determination is made that enough data has been transferred.

12. The system of claim 11, wherein the indication to spill data comprises a desired amount of data to transfer.

13. The system of claim 1, wherein the processor is further configured to:
    in response to a determination to process data in batched mode:
        determine a batch of input table entries;
        determine a batch of keys, wherein each batch key of the batch of keys is based at least in part on a batch input table entry of the batch of input table entries and the grouping column; and
        add the batch of keys to a grouping hash table, wherein adding the batch of keys to the grouping hash table comprises batched last in first out spilling when necessary.

14. The system of claim 13, wherein adding the batch of keys to the grouping hash table comprises:
    setting a query number of probe steps to zero;
    repeating a process of:
        searching for a next key of a the batch of keys that can be added to the grouping hash table with the query number of probe steps;
        in response to finding the next key of the batch of keys that can be added to the grouping hash table with the query number of probe steps, adding the next key to the grouping hash table;
        in response to not finding the next key of the batch of keys that can be added to the grouping hash table with the query number of probe steps, incrementing the query number of probe steps until all keys of the batch have been added to the grouping hash table.

15. The system of claim 13, wherein adding the batch of keys to the grouping hash table additionally comprises determining whether there are enough available buckets in a bucket table.

16. The system of claim 15, wherein the processor is further configured to perform a batched resize operation on the bucket table in response to determining that there are not enough available buckets in the bucket table.

17. The system of claim 16, wherein the batched resize operation comprises:
    deleting the bucket table;
    creating a new bucket table; and
    for each payload of a set of payloads:
        in response to determining that a link from a bucket of the new bucket table to the payload does not exist:

determining a batch of keys that contained the key of the payload; and adding the batch of keys to the grouping hash table comprising the new bucket table.

18. The system of claim 16, wherein the batched resize operation comprises providing a request for additional memory.

19. The system of claim 18, wherein an indication to spill data is received in response to the request for additional memory.

20. The system of claim 19, wherein the processor is further configured to execute batched last in first out spilling using a partition order, wherein the partition order is such that rows in a first partition precede all rows in a second partition in a last-in-first-out order of an original insertion into the grouping hash table.

21. The system of claim 19, wherein the processor is further configured to execute a batched last in first out spilling process in response to the indication to spill data, wherein the batched last in first out spilling process comprises:

determining a most recently added payload of a set of payloads;

determining the batch that contained the key associated with the most recently added payload;

transferring the most recently added payload to another storage location; and clearing a bucket associated with the most recently added payload.

22. A method, comprising:

receiving an indication to perform a GROUP BY operation, wherein the indication comprises an input table and a grouping column;

for each input table entry of the input table:

determining a key using a processor, wherein the key is based at least in part on the input table entry and the grouping column;

adding the key to a grouping hash table, wherein adding the key to the grouping hash table comprises:

determining whether there is an available bucket for the key in a bucket table of the grouping hash table; and in response to a determination there is not an available bucket in the bucket table, resizing the bucket table, wherein resizing the bucket table comprises last in first out spilling;

creating an output table based at least in part on the grouping hash table; and providing the output table.

23. A computer program product embodied in a non-transitory computer readable medium and comprising computer instructions for:

receiving an indication to perform a GROUP BY operation, wherein the indication comprises an input table and a grouping column;

for each input table entry of the input table:

determining a key, wherein the key is based at least in part on the input table entry and the grouping column;

adding the key to a grouping hash table, wherein adding the key to the grouping hash table comprises:

determining whether there is an available bucket for the key in a bucket table of the grouping hash table; and in response to a determination there is not an available bucket in the bucket table, resizing the bucket table, wherein resizing the bucket table comprises last in first out spilling;

creating an output table based at least in part on the grouping hash table; and providing the output table.

* * * * *